United States Patent [19]
Yoerkie, Jr. et al.

[11] Patent Number: 5,131,604
[45] Date of Patent: Jul. 21, 1992

[54] HELICOPTER ANTITORQUE DEVICE

[75] Inventors: Charles A. Yoerkie, Jr., Newington; Philip H. LeMasurier, New Fairfield; Steven D. Weiner, Orange, all of Conn.

[73] Assignee: United Technologies Corporation, Hartford, Conn.

[21] Appl. No.: 683,904

[22] Filed: Apr. 11, 1991

[51] Int. Cl.$^5$ .............................................. B64C 27/82
[52] U.S. Cl. ................................. 244/17.19; 416/238
[58] Field of Search ................. 244/17.19; 416/189 R, 416/189 A, 189 B, 179; 415/209.2, 209.3, 191

[56] References Cited

U.S. PATENT DOCUMENTS 3,241,791  3/1966  Piasecki ............................ 244/17.19
4,927,331  5/1990  Vuillet ................................. 416/238

OTHER PUBLICATIONS

USAAMRDL Technical Report 71-23, Arthur W. Grumm & Groves E. Herrick, Jul. 1971, pp. 10, 11, 15-18.
Aerospatiale SA-365 Dauphin-Panther, *Modern Fighting Helicopters*, 1986, p. 92.

*Primary Examiner*—Joseph F. Peters, Jr.
*Assistant Examiner*—Anne E. Bidwell
*Attorney, Agent, or Firm*—Terrance J. Radke

[57] ABSTRACT

A ducted fan antitorque device for a helicopter having an empennage structure including a shroud configured for internal mounting of the ducted fan antitorque device. The ducted fan antitorque device has a configuration optimized to provide the antitorque thrust required for helicopter yaw stability and maneuverability and to minimize the operating noise levels of the ducted fan antitorque device. The ducted fan antitorque device includes an airflow duct and a fan assembly coaxially mounted within the airflow duct. The airflow duct includes an inlet having a curved lip configuration of constant radius, a divergent duct portion downstream of and contiguous with the inlet having a predetermined divergence angle, and an outlet terminating the divergent duct portion having a curved lip configuration of variable radius. The fan assembly includes a central hub structure, a plurality of support struts for coaxially mounting the hub structure in the airflow duct, and a tail rotor subsystem rotatably mounted on the hub structure. The support struts have an elliptical configuration to enhance the aerodynamic performance and reduce the noise generated by the ducted fan antitorque device. One of the support struts is radially orientated and two other struts are non-radially orientated with respect to the axis of the ducted fan antitorque device. The tail rotor subsystem is a rigid rotor having eight tail rotor blades. The support struts are spaced apart from the plane of the tail rotor blades by a predetermined distance based upon an axis dimension of the elliptical configuration of the support struts.

16 Claims, 5 Drawing Sheets

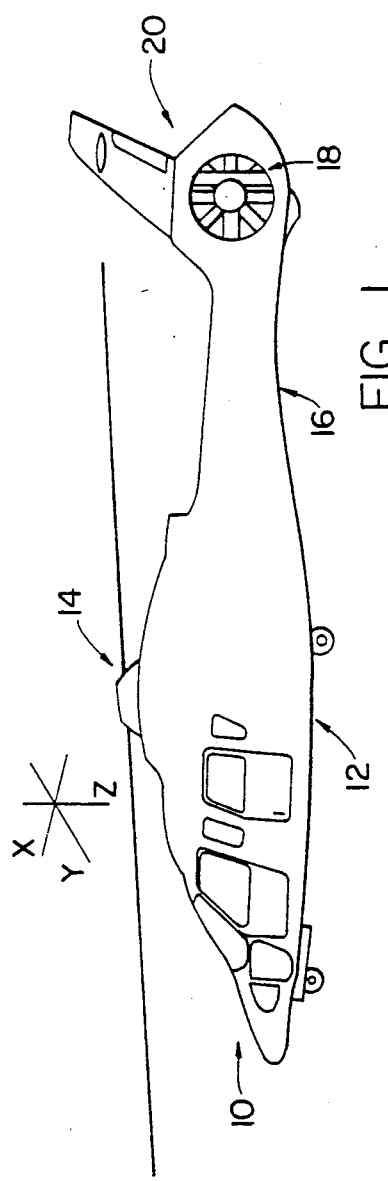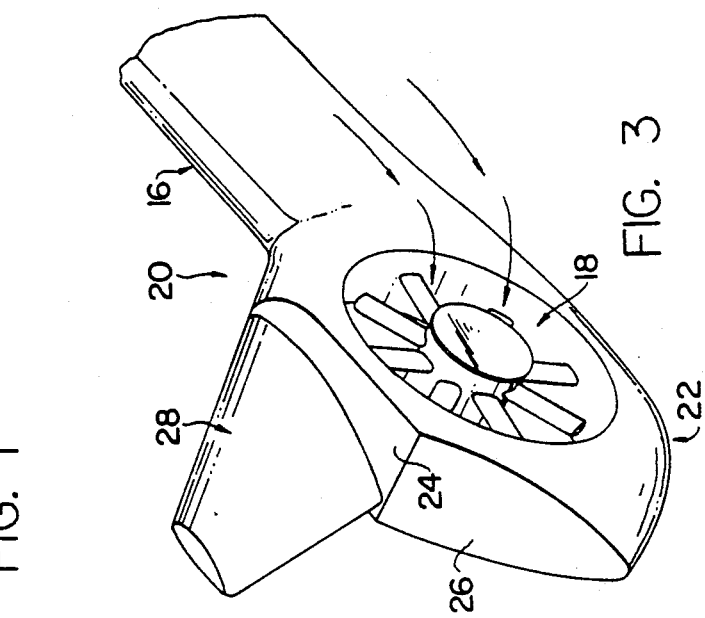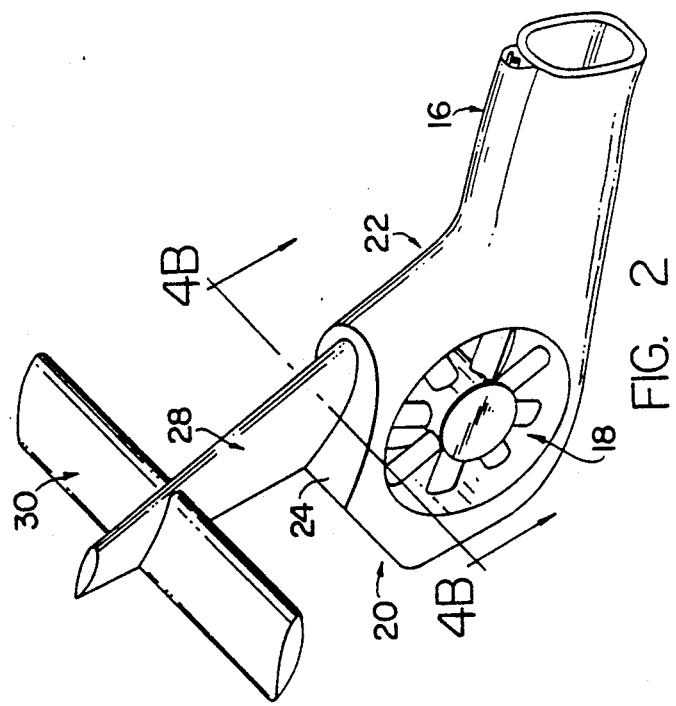

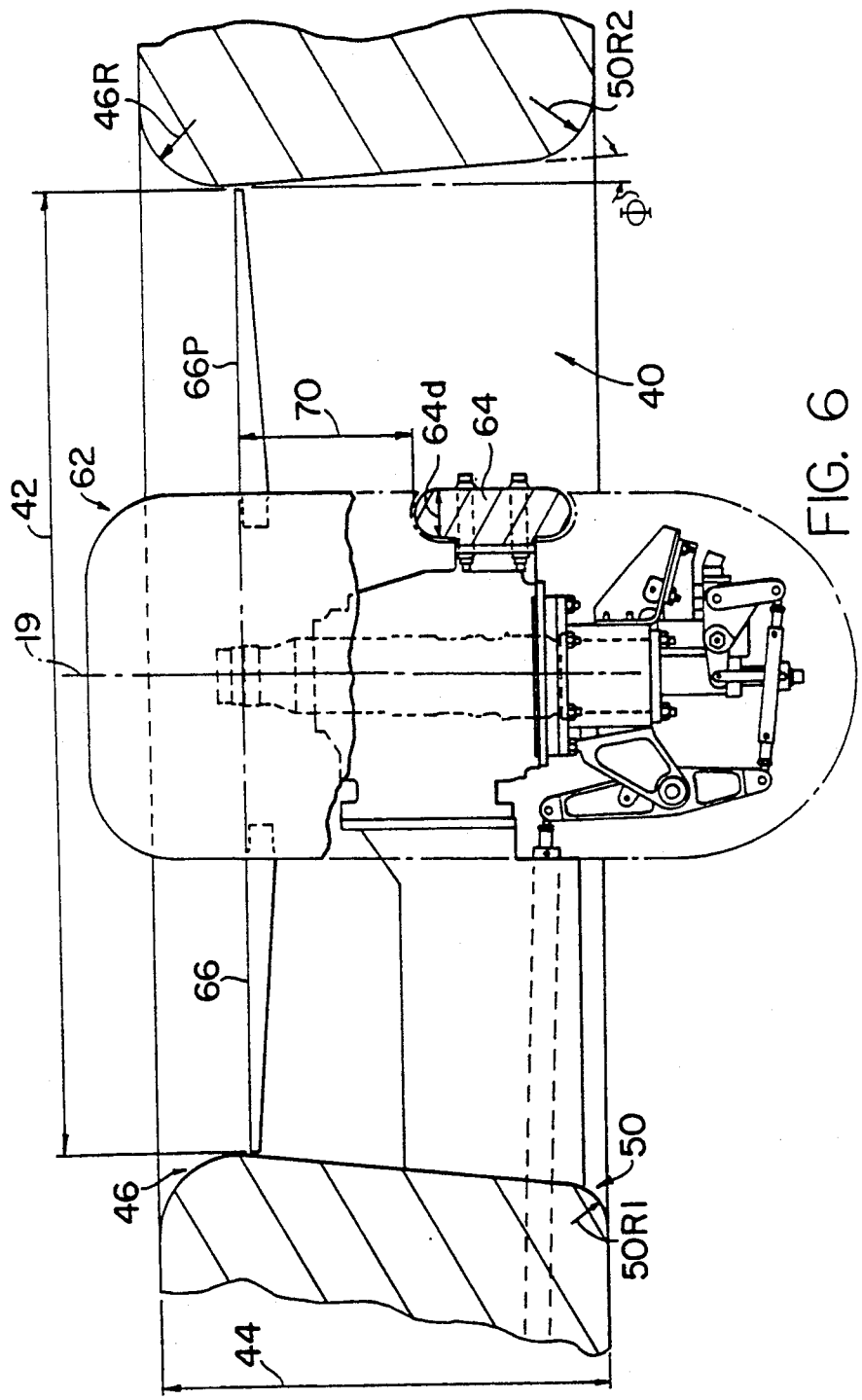

HELICOPTER ANTITORQUE DEVICE

TECHNICAL FIELD

The present invention is directed to helicopters, and more particularly, to the configuration and characteristics of a ducted fan antitorque device embodied in a helicopter empennage structure.

RELATED APPLICATIONS

The subject matter of the present invention is related to co-pending patent applications entitled INTEGRATED HELICOPTER EMPENNAGE STRUCTURE (Now U.S. Pat. No. 5,102,067), and SHROUD-FIN INTEGRATION SHELF FOR A HELICOPTER EMPENNAGE STRUCTURE (Now U.S. Pat. No. 5,108,044).

BACKGROUND OF THE INVENTION

The majority of modern day helicopters embody a single main rotor assembly and an exposed tail rotor assembly (noted exceptions being the Aerospatiale helicopters employing a fenestron tail structure and the McDonnell Douglas helicopters employing the NOTAR TM antitorque device). The exposed tail rotor assembly has proven to be a relatively efficient and reliable means for providing lateral thrust to counteract the fuselage induced torque generated by the main rotor assembly and to provide yaw directional control of the helicopter in hover, transitional, low, and high speed flight regimes.

Exposed tail rotor assemblies, however, present disadvantages from both an aerodynamic and non-aerodynamic point of view. First and foremost, exposed tail rotor assemblies present significant safety hazards during ground operations, i.e., system run-up, hovering, taxing, and/or parking operations. The exposed tail rotor assembly poses a severe danger to adjacent personnel during ground operations. Personnel have been killed or injured by inadvertent contact with the rotating tail rotor blades of an exposed tail rotor assembly. The operating exposed tail rotor assembly also poses a hazard to other equipment located in areas of helicopter ground operations. In addition, exposed tail rotor assemblies are vulnerable to damage from objects circulated by the slip stream of the main rotor assembly.

The exposed tail rotor assembly also presents problems during helicopter flight operations such as take-offs, landings, and or maneuvering in confined areas where care must be taken to prevent inadvertent strikes of the exposed tail rotor assembly with terrain features such as power lines, buildings, fences, trees, and bushes. Numerous military applications and some civilian applications require nap of the earth (NOE) flying, sometimes at night or in reduced visibility weather. Flying in such conditions requires extra care to prevent inadvertent strikes of the exposed tail rotor assembly with such terrain features. Moreover, the exposed tail rotor assembly is a significant noise source in both civilian operations where it is an annoyance factor and in military operations where it is a factor in detection, identification, location, and/or tracking of the helicopter.

In addition, the aerodynamic efficiency of exposed tail rotor assemblies is degraded by various factors arising out of the very nature of such assemblies. An exposed tail rotor assembly is not generally utilized to provide the total yaw stability in higher speed flight regimes due to drag effects and induced stresses acting on the tail rotor blades. Instead, an aerodynamically-configured vertical stabilizer is incorporated in the configuration of the helicopter empennage to provide a portion of the required yaw stability in higher speed flight regimes. The exposed tail rotor assembly, however, still provides an observable contribution to the total aerodynamic drag in such flight regimes.

To provide the antitorque thrust (lateral lift) required for hover operations and yaw maneuvers during transitional, low, and high speed flight regimes, the typical exposed tail rotor assembly has large diameter tail rotor blades (to reduce the engine power required by the tail rotor assembly to develop such thrust). The tail rotor assembly must be mounted on the vertical stabilizer to provide the necessary ground clearance for the tail rotor blades. Such an arrangement, however, results in aerodynamic interference between the vertical stabilizer and the exposed tail rotor assembly (stabilizer blockage) that reduces the aerodynamic efficiency of the exposed tail rotor assembly. This arrangement may also interfere with the aerodynamic functioning of the vertical tail structure in higher speed flight regimes. In addition, such an arrangement creates an induced roll moment about the longitudinal axis of the helicopter.

Furthermore, an exposed tail rotor assembly is generally a mechanically complex and fragile apparatus that is subjected to severe operating stresses and dynamic phenomena such as relative wind, main rotor assembly and fuselage slip streams and vortices that reduce the operating efficiency thereof. Exposure to such operating conditions tends to limit the overall useful lifetime of an exposed tail rotor assembly such that the costs associated with more frequent maintenance/overhaul are increased. In addition, exposed tail rotor assemblies are subjected to increased blade loading effects during flights at increased sideslip angles, which tends to restrict the effective operating envelope with respect to sideslips for helicopters having exposed tail rotor assemblies.

A helicopter embodying a fenestron or ducted fan antitorque device in the empennage structure provides several aerodynamic and non-aerodynamic advantages over the conventional helicopter configuration. An operating ducted fan antitorque device does not present a significant hazard to adjacent personnel or equipment. Furthermore, the empennage structure effectively shields the ducted fan from damage induced by external objects.

Acoustically, a ducted fan antitorque device provides several advantages over an exposed tail rotor assembly. The duct shields the fan noise from the far field observer, especially in the direction of flight. The thrust augmentation provided by the duct substantially reduces the loading noise component from the fan blades—a primary noise source at the lateral aspects of the helicopter. Further, the acceleration induced by the duct in the mass airflow influx into the fan assembly substantially reduces the turbulence of the mass airflow influx which may be a significant noise source from the fan blades. In addition, a relatively large number of blades increases the harmonic frequencies generated by the fan assembly to such an extent that atmospheric absorption and ground attenuation may provide significant attenuation of the fundamental and higher harmonics, noise yet not so high as to be in the range of highest hearing sensitivity. Typically, the first few harmonics of an exposed tail rotor assembly are so low as to allow for long range propagation while the relatively large number of blades of the Aerospatiale fenestron (generally 11 or 13) places the second and first harmonics, as well as higher harmonics, in the frequency range of the highest hearing sensitivity.

Aerodynamically, a ducted fan antitorque device may be effectively off-loaded in higher speed flight regimes, thereby providing a reduction in total aerodynamic drag in these flight regimes. The vertical stabilizer does not aerodynamically interfere with the operation of a ducted fan antitorque device. The tail rotor assembly of the ducted fan antitorque device is not exposed to external dynamic phenomena such that the overall lifetime of the ducted fan tail rotor assembly is improved, with the concomitant decrease in maintenance requirements. A ducted fan antitorque device effectually reduces stresses experienced by tail rotor blades during sideslip flight regimes, thereby expanding the operating envelope of helicopters embodying ducted fan antitorque devices. For equivalent rotor defined apertures, the aerodynamic efficiency of the ducted fan antitorque device is greater than that of an exposed tail rotor assembly such that the ducted fan antitorque device may be downsized for incorporation in the empennage structure while still providing substantially equivalent aerodynamic performance. This reduced diameter allows the device to be mounted at a lower waterline, eliminating the induced roll moment about the longitudinal axis of the helicopter as experienced by helicopters utilizing exposed tail rotor assemblies.

Aerospatiale has produced several lines of helicopters such as the Dauphin and Gazelle that include an empennage structure embodying a ducted fan antitorque device and a vertical stabilizer in combination to provide antitorque thrust and yaw directional control for a helicopter. The ducted fan antitorque devices of these helicopters have an duct axis that is substantially perpendicular to the vertical plane of symmetry of the helicopter, i.e., the tail rotor blade plane is parallel to the vertical plane. The transverse thrust developed by these antitorque devices is sufficient to provide the necessary antitorque force and yaw directional control in the hover, translational, low, and high forward speed flight regimes. The empennage structure of these helicopters includes a vertical stabilizer that is aerodynamically configured to provide lateral thrust for antitorque and yaw stability at higher forward speeds.

U.S. Pat. No. 4,809,931, issued to Aerospatiale, discloses that such prior art empennage structures do not provide any pitch stability, particularly at higher forward speeds. The '931 patent teaches that a horizontal stablizing surface is required to provide an empennage structure that provides both static and dynamic yaw and pitch stability as well as the counterbalancing antitorque thrust. The '931 patent further teaches that this type of empennage structure is disadvantageous in that it results in a substantial increase in overall structural weight of the helicopter.

Another prior art empennage structure embodying a ducted fan antitorque device is described in the '931 patent, this prior art empennage structure replacing the vertical and horizontal stabilizers with two aerodynamic surfaces. The '931 patent teaches that the two aerodynamic surfaces extend above a horizontal plane passing through the top of the housing of the ducted fan antitorque device, and that the mean planes of the aerodynamic surfaces are disposed symmetrically with respect to each other about the vertical plane passing through the housing to define a "V" empennage. These aerodynamic surfaces are described as being configured to provide antisymmetrical aerodynamic lift profiles. The '931 patent teaches that such an empennage configuration has not achieved the advantageous results expected.

The subject matter described and claimed in the '931 patent is a helicopter empennaqe structure embodying a ducted fan antitorque device that simultaneously provides the antitorque force and static and dynamic stability about the yaw and pitch axes. The '931 patent teaches that the mean plane of the ducted fan antitorque housing is slanted with respect to the vertical plane of symmetry of the helicopter in an angular range of 0° to 45°. Two aerodynamic surfaces are joined in combination at the top of the housing to form a "V" empennage extending above the horizontal plane passing through the top of the housing. The '931 patent teaches that the two aerodynamic surfaces are disposed in several different embodiments wherein the respective mean planes of the aerodynamic surfaces extend disymmetrically with respect to the vertical plane of symmetry of the helicopter. The mean plane of the two aerodynamic surfaces are described as forming predetermined angles, selected from a defined range of angles, with respect to the horizontal and vertical, respectively.

SUMMARY OF THE INVENTION

One object of the present invention is to provide a helicopter ducted fan antitorque device having a configuration optimized to provide the antitorque thrust required for helicopter yaw stability and maneuverability while concomitantly minimizing the operating noise levels of the ducted fan antitorque device.

Another object of the present invention is to provide a ducted fan antitorque device comprising an airflow duct housing a fan assembly that includes elliptically shaped support struts for mounting the fan assembly hub structure in the duct which reduce aerodynamic loading and induced loading noise on the tail rotor blades during normal operation and which reduce turbulent ingestion during reverse thrust conditions.

Still another object of the present invention is to provide a ducted fan antitorque device wherein some of the elliptically shaped support struts are non-radially orientated with respect to the ducted fan antitorque device axis to minimize induced tail rotor blade loading noise.

A further object of the present invention is to provide a ducted fan antitorque device wherein the aerodynamically shaped support struts are spaced apart a predetermined distance downstream of the tail rotor blade plane to substantially eliminate acoustic interaction tones induced on the tail rotor blades by the support struts.

Yet another object of the present invention is to provide a ducted fan antitorque device wherein the fan assembly has eight rotor blades configured for enhanced aerodynamic performance and reduced noise generation.

Yet a further object of the present invention is to provide a ducted fan antitorque device having an airflow duct configured to provide mass airflow having an attached boundary layer and a relatively uniform velocity distribution which helps reduce turbulence related noise.

Still a further object of the present invention is to provide a ducted fan antitorque device having an outlet duct configuration of variable radius to improve the reverse thrust capability and to reduce the parasite drag of the ducted fan antitorque device.

One more object of the present invention is to provide a ducted fan antitorque device wherein the airflow duct includes a divergent duct portion downstream of the tail rotor blade plane to provide an attached mass airflow efflux and satisfactory performance during reverse thrust conditions.

These and other objects are achieved by a ducted fan antitorque device according to the present invention embodied in the empennage structure of a helicopter having a fuselage, a main rotor assembly, and a tail boom. The empennage structure includes a shroud integral with the tail boom and configured to house the ducted fan antitorque device, an aft shroud closure, a shroud-fin integration shelf, a vertical stabilizer, and a horizontal stabilizer disposed in intersecting combination with the vertical stabilizer.

The ducted fan antitorque device according to the present invention is optimally configured to provide the aerodynamic thrust required by the helicopter for yaw stability and maneuverability in hover and forward flight operations, to provide a vertical lift component that contributes to the general lift capability of the helicopter, and to minimize the operating noise levels of the ducted fan antitorque device. The configuration of the ducted fan antitorque device and the operating characteristics thereof such as fan thrust and fan control range are determined by the mission requirements of the helicopter.

The ducted fan antitorque device is disposed in combination with the shroud to provide a low torque waterline so that the ducted fan antitorque device does not contribute a significant roll moment when collective pitch is increased (which causes a corresponding increase in antitorque thrust). Such spatial positioning of the ducted fan antitorque device eliminates the need for mechanical coupling of the lateral cyclic to the collective.

The ducted fan antitorque device according to the present invention comprises an airflow duct and a fan assembly mounted within the duct. The duct is disposed in combination within the shroud so that the axis of the ducted fan antitorque device is substantially perpendicular to the medial plane of the shroud. The resultant spatial orientation of the ducted fan antitorque device of one preferred embodiment is such that the axis is canted relative to the transverse axis of the helicopter by a predetermined cant angle.

The configuration of the airflow duct includes a duct diameter, a duct width (transverse dimension), an inlet having an inlet lip configuration of predetermined constant radius, a divergent duct portion, and an outlet having an outlet lip configuration of predetermined, variable radius. The configurations and dimensions of various elements comprising the duct influence the overall aerodynamic performance of the ducted fan antitorque device according to the present invention.

The diameter of the main rotor assembly and the operating characteristics thereof define the range of antitorque thrust that must be provided by the ducted fan antitorque device to counterbalance the induced-torque effects of the main rotor assembly. In addition, the ducted fan antitorque device must be operative to provide any additional thrust dictated by flight operating constraints of the helicopter. The size of the fan assembly (e.g., span of the tail rotor blades) is one of the primary determinants of the thrust generation capability of the ducted fan antitorque device.

The diameter of the fan assembly, however, is directly related to and influences the sizing of the duct diameter. An increased duct diameter permits a larger diameter fan assembly to be utilized to generate the required antitorque thrust, which decreases the power required by the ducted fan antitorque device and the frequencies of the harmonic noise. Such a configuration, however, imposes an increased weight on the ducted fan antitorque device, and hence, overall system weight. Decreasing the duct diameter reduces the diameter (and hence weight) of the fan assembly, but increases the frequencies of the harmonic noise and requires more power to produce the required antitorque thrust. These factors are weighted to provide an optimal duct diameter for the ducted fan antitorque device according to the present invention.

Optimally a duct width (transverse dimension) to diameter (L/D) ratio of 1.0 maximizes antitorque thrust production by the ducted fan antitorque device. A duct width equal to the diameter, however, is not a practical consideration for the empennage structure since this would result in a large shroud width (transverse dimension) with the concomitant weight increase. A primary factor in determining duct width from a pragmatic perspective is the separation distance between the plane of the tail rotor blades and the leading edge of the hub support struts. An L/D ratio of about 0.4 provides a ducted fan antitorque device configuration capable of effectively providing the required level of antitorque thrust.

The aerodynamic performance of the ducted fan antitorque device is significantly influenced by the configuration of the inlet. The inlet configuration determines the degree of distortion of the mass airflow influx (non-uniformity of the airflow velocity distribution), the characteristic of the boundary layer flow (attached or separated), and the sideforces induced on the empennage structure resulting from redirection of the mass airflow influx. The configuration of the inlet should provide the fan assembly with mass airflow having an attached boundary layer and a relatively uniform velocity distribution, i.e., minimized turbulence, to the extent practicable.

A curved inlet configuration is clearly preferable to a sharp-edged inlet configuration due to consideration of mass airflow separation effects. A small radius of curvature lip, in combination with a downstream divergent duct portion (following the blade plane of the fan assembly) provides good performance in both the hover and higher speed flight regimes by allowing the mass airflow influx to remain attached to the inlet surface. The inventors determined that a magnitude for the ratio of the inlet lip radius to the diameter of greater than 0.065 to about 0.075 produces satisfactory mass airflow influx during hover operations and in higher speed forward flight regimes.

The divergent duct portion of the airflow duct (defined as that portion of the duct downstream from the plane of the tail rotor blades of the fan assembly) in combination with the configuration of the outlet effects the shape of the mass airflow efflux, which in turn influences the performance of the ducted fan antitorque device. The divergent duct portion and the outlet are configured to prevent separation of the mass airflow from the duct walls and to eliminate slipstream contraction aft of the ducted fan antitorque device. An effective interaction between the divergent duct portion and the outlet provides an increase in mass airflow influx into the ducted fan antitorque device during flight operations.

The configuration of the divergent duct portion facilitates pressure recovery on the duct. An excessive divergence angle, however, will cause flow separation from the duct walls, increase turbulence noise, and degrade reverse thrust operation (mass airflow through the duct is reversed in left sideslip flight conditions such that the inlet functions as the outlet and vice versa). A duct divergence angle of about 5° provides attached mass airflow through the divergent duct portion of the duct, and also provides satisfactory performance during reverse thrust operations.

Conventional design methodology typically utilizes an outlet having an acute lip configuration (sharp angle or minimal radius) to cleanly separate the mass airflow efflux from the adjacent tail structure. An acute lip configuration minimizes suction effects at the outlet, suction effects at the outlet causing a degradation in the antitorque thrust producing capability of a ducted fan antitorque device. An acute lip configuration, however, degrades the performance of a ducted fan antitorque device during reverse thrust operations wherein the outlet effectively functions to provide mass airflow influx.

An outlet having a curved lip configuration of variable radius improves the reverse thrust capability of the ducted fan antitorque device, and in addition, reduces the parasite drag of the ducted fan antitorque device in forward flight regimes. The curved lip configuration of the present invention includes a first constant radius lip segment, a second constant radius lip segment, and intermediate variable radius transition segments that provide a smooth structural transition between the first and second constant radius lip segments. The first constant radius lip segment has a radius of curvature less than the radius of curvature of the second constant radius lip segment. The first constant radius lip segment encompasses a 180° sector of the curved lip configuration (sector is symmetrically disposed with respect to the longitudinal axis in the forward direction) and the second constant radius lip segment encompasses a 90° sector of the curved lip configuration (sector is symmetrically disposed with respect to the longitudinal axis in the aft direction) for one preferred embodiment.

The fan assembly includes an aerodynamically-shaped hub structure, a plurality of aerodynamically configured support struts for mounting the hub structure in the airflow duct, and a plurality of tail rotor blades rotatably attached to the hub structure. The tail rotor blades are aerodynamically configured and manipulable for the generation of thrust. The hub structure functions as a housing for fan assembly operating subsystems such as the tail rotor gearbox and the servo controls for regulating the operation (pitch changes) of the tail rotor blades. The hub structure also functions as the rotational mount for the tail rotor blades.

The plane of the tail rotor blades is transverse to the axis of the ducted fan antitorque device and is located immediately downstream of the curvature termination point of the inlet lip radius. The separation distance between the blade plane and the leading edges of the support struts is a primary factor affecting noise generation by the ducted fan antitorque device. To essentially eliminate acoustic interaction tones induced on the rotor blades by the support struts, the ratio of the separation distance to the strut dimension, should be relatively large, on the order of about 2.0 to about 2.5.

The support struts have an elliptical configuration to minimize turbulence and vortex shedding. Elliptically configured support struts reduce loading on the tail rotor blades during normal operation of the ducted fan antitorque device, and concomitantly, the induced loading noise, and reduce thrust losses due to separation drag. The elliptical configuration also reduces turbulence ingestion in the reverse thrust condition, which concomitantly reduces noise arising from turbulence induced loading. Minimally the elliptical configuration for the support struts should be a 2:1 ellipse, and preferably a 3 to 3.5:1 ellipse.

The ducted fan antitorque device of the present invention utilizes three elliptically-configured support struts that function as structural supports to coaxially mount the hub structure within the airflow duct. One end of each support strut passes through the duct to secure the support struts to structural members of the shroud. A first support strut is a radially disposed (with respect to the axis), longitudinally orientated (with respect to the helicopter axes) aerodynamically-configured support structure extending between the hub structure and the airflow duct. A control rod and a drive shaft, which provide interfacing between the control system and the transmission system and fan assembly operating subsystems (servo control and tail rotor gearbox, respectively), are housed internally within the first support structure.

The other two aerodynamically-configured support struts are radially off-set from the axis, i.e., provide non-radial mounting structures between the hub structure and the shroud. These support struts are collinear with respect to one another and vertically orientated (with respect to the helicopter axes). Tail rotor blade sweep over the non-radial, vertically orientated support struts is relatively gradual as compared to radially orientated support struts (instantaneous blade sweep) such that induced pressure (loading) gradients on the tail rotor blades are shallow. The non-radial, vertical orientation of the support struts minimizes induced blade loading noise.

The tail rotor subsystem is a rigid rotor having a plurality of tail rotor blades. Eight tail rotor blades were selected for the tail rotor subsystem of the ducted fan antitorque device based upon acoustic, reliability, durability, and survivability considerations. Fewer blades allows each individual blade to have a larger and more rugged configuration. A tail rotor subassembly having only eight tail rotor blades facilitates reduction of the blade passage frequency phenomenon which causes the loudest portion of the blade generated noise level to be well below the audio frequency range of highest hearing sensitivity, yet not so low as to allow long range propagation of the fan acoustic signature.

The rotor blades have an untapered planform configuration which provides maximum thrust generating capability and simplifies blade manufacturing procedures. The airfoil section of the tail rotor blades is a NACA 64 series such as the 64A322 airfoil which provides the best performance at the tip design tip speed over the required range of operating conditions. Each rotor blade has a predetermined chord to provide high solidity and low blade loading. Each rotor blade has a predetermined twist of about −7° twist hub-to-tip to provide good control response, particularly at low and negative thrust levels.

The tail rotor blades are operative for bottom blade forward (BBF) rotation to minimize interference effects with the main rotor wake. The pitch control range of the tail rotor blades has been increased to permit pitch control regulation over a wide control range for thrust variation maneuverability, particularly in effecting new maneuvers. The control rod of the fan assembly operating subsystems provides the means for effecting such pitch changes. For the one preferred embodiment, the control range for the tail rotor blades is about $-35°$ to about $+50°$. The $50°$ positive pitch limit was selected to coincide with the onset of stall of the tail rotor blades in the hover regime. The operating tip speed for the tail rotor blades was selected based upon noise considerations. A lower blade tip speed reduces both the amplitude and the frequency of blade tip generated noise. To optimize fan assembly performance by minimizing pressure losses across the rotor blades, a small clearance is provided between the tips of the rotor blades and the surface of the airflow duct.

Due to the characteristics of the mass airflow influx into the ducted fan antitorque device during operation thereof, the inlet lip configuration and portions of the shroud adjacent thereto function as aerodynamic lifting surfaces in hover and forward flight regimes to provide thrust augmentation, i.e., thrust over and above that produced by the fan assembly of the ducted fan antitorque device. The thrust augmentation provided by the inlet lip configuration and adjacent portions of the shroud is a result of the reduced static pressure in these regions as a result of fan assembly induced velocities in the mass airflow influx. Further, the duct augmentation reduces the required thrust from the fan itself which reduces fan loading noise.

For an ideal ducted fan antitorque device, suction as a result of the reduced static pressure is equal in magnitude to the thrust produced by the ducted fan antitorque device, resulting in an optimum thrust augmentation factor of two. In right and left sideslip flight conditions, the optimum thrust augmentation factor decreases and increases, respectively, due to induced velocity dependence. In the forward flight regimes, the thrust increment due to the inlet lip configuration is greater than the hover value due to stoppage of the mass airflow influx momentum and the re-expansion of stagnated mass airflow from the duct outlet.

For the ducted fan antitorque device as described in the preceding paragraphs, actual thrust augmentation is approximately equal to optimum thrust augmentation for the hover and sideward flight regimes of the helicopter. Actual thrust augmentation in the forward flight regimes is close to the ideal value of two, although some loss of lift is experienced due to free stream turning of the mass airflow influx.

BRIEF DESCRIPTION OF THE DRAWINGS

A more complete understanding of the present invention and the attendant advantages and features thereof will be more readily attained by reference to the following detailed description when considered in conjunction with the accompanying drawings wherein:

FIG. 1 is a side plan view of a helicopter embodying a ducted fan antitorque device according to the present invention in an integrated empennage structure.

FIG. 2 is a first computerized perspective view of one embodiment of the integrated empennage structure.

FIG. 3 is a second computerized partial perspective view of the integrated empennage structure.

FIG. 6 is a cross-sectional view of the ducted fan antitorque device of FIG. 5A taken along line 6—6 thereof.

DETAILED DESCRIPTION OF THE PREFERRED EMBODIMENTS

Figures 4A, 4B, 4C, 4D:
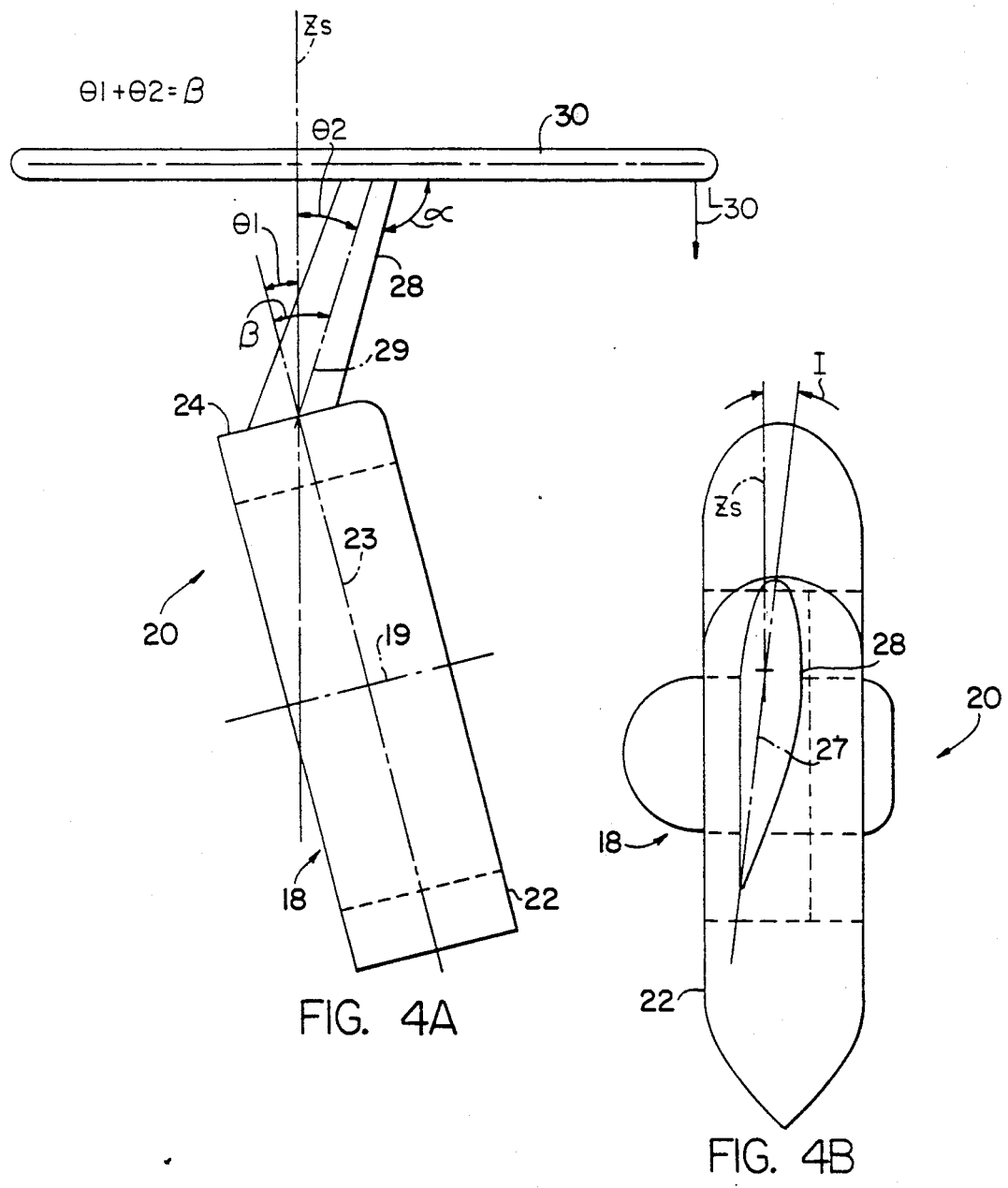
FIG. 4A is a schematic view illustrating the spatial orientation of an embodiment of the integrated empennage structure.
FIG. 4B is a cross-sectional plan view of the integrated empennage structure of FIG. 2 taken along line 4B—4B.
FIG. 4C illustrates the thrust diagram for the ducted fan antitorque device of the integrated empennage structure of FIG. 4A.
FIG. 4D illustrates the force diagram for the vertical stabilizer of the integrated empennage structure of FIG. 4A.

Referring now to the drawings wherein like reference alphanumerics designate corresponding or similar elements throughout the several views, a helicopter 10 embodying a ducted fan antitorque device is illustrated in FIG. 1. The helicopter 10 includes a fuselage 12, a main rotor assembly 14, a tail boom 16, and an empennage structure 20 that includes a ducted fan antitorque device 18 according to the present invention. Also illustrated in FIG. 1 is the reference system associated with the helicopter 10, an X—X axis defining the longitudinal axis, a Y—Y axis defining the lateral axis, and a Z—Z axis defining the vertical axis. A vertical plane Zs, defining the medial plane of symmetry of the helicopter fuselage 12, is shown in FIG. 4A. In the following disclosure, references to the vertical plane Zs should be understood as also encompassing planes parallel to the vertical plane Zs.

The main rotor assembly 14 includes the power system (not shown—typically one to three turbine engines) that provides the profile, induced, parasite and climb power for turning the main rotor blades, lifting the helicopter 10, propelling the helicopter 10 in forward flight, and maneuvering the helicopter 10 in ascents and descents, respectively. The main rotor assembly 14 also includes a transmission system (not shown) that transmits engine power to the main rotor blades and the ducted fan antitorque device 18.

An exemplary empennage structure 20 for a helicopter 10 is illustrated in further detail in FIGS. 2, 3. The empennage structure 20 includes a shroud 22 integral with the tail boom 16, a shroud-fin integration shelf 24, an aft shroud closure 26, a vertical fin or stabilizer 28, and a horizontal fin or stabilizer 30 intersecting the vertical stabilizer 28. The ducted fan antitorque device 18 is mounted in the shroud 22.

Those skilled in the art will appreciate that the overall aerodynamic performance of the ducted fan antitorque device 18 of the present invention depends upon both the characteristics of the individual elements comprising the empennage structure 20 and the interactive relationships among these individual elements. The subject matter of the present invention is directed to the characteristics and interactive relationships of the components comprising the ducted fan antitorque device 18 embodied in the empennage structure 20. The shroud 22, the vertical stabilizer 28, and the horizontal stabilizer 30 and the shroud-fan integration shelf 24 and the aft shroud closure 26 of the empennage structure 20 are the subject matter of co-pending patent applications entitled INTEGRATED HELICOPTER EMPENNAGE STRUCTURE (Now U.S. Pat. No. 5,102,067) and SHROUD-FIN INTEGRATION SHELF FOR A HELICOPTER EMPENNAGE STRUCTURE (Now U.S. Pat. No. 5,108,044), respectively. A brief description of the characteristics of these elements is presented in the following paragraphs to facilitate a better understanding of the characteristics of the subject matter of the present invention.

The shroud-fin integration shelf 24 and the aft shroud closure 26 have predetermined structural configurations selected to counterbalance specific aerodynamic effects encountered during certain helicopter flight conditions. The shroud-fan integration shelf 24 is the transition structure between the shroud 22 and the vertical stabilizer 28. The shroud-fan integration shelf 24 is configured to separate the mass airflow efflux from the ducted fan antitorque device 18 during nose-right sideslips at higher speed flight regimes. Such mass airflow efflux would otherwise interfere with the aerodynamic operation of the vertical stabilizer 28 during such flight conditions, as described hereinbelow.

The aft shroud closure 26, as its name implies, is the closing structure for the trailing portion of the shroud 22. The aft shroud closure 26 is configured to fix the separation points of mass airflow over the aft portion of the shroud 22. The separation points of the mass airflow would otherwise wander over the aft portion of the shroud 22 during various flight conditions, which would adversely affect the yaw stability of the helicopter 10. A more detailed description of the structural and functional characteristics of the shroud-fin integration shelf 24 and the aft shroud closure 26 is presented in commonly-owned, co-pending patent application entitled SHROUD-FIN INTEGRATION SHELF FOR A HELICOPTER EMPENNAGE STRUCTURE (Now U.S. Pat. No. 5,108,044), which is incorporated herein by reference.

The aerodynamic configurations and orientations and the spatial orientations of the shroud 22, vertical stabilizer 28, and the horizontal stabilizer 30 comprising the integrated empennage structure 20 are optimized to provide the necessary aerodynamic forces required for helicopter 10 flight operations. Lateral or antitorque thrust is provided by the empennage structure 20 for yaw stability and directional control of the helicopter 10 in the hover and forward flight regimes. The empennage structure 20 also provides vertical force components for pitch static stability and maneuverability in forward flight operations.

The spatial orientation of the shroud 22 housing the ducted fan antitorque device 18 and the spatial orientation of the vertical stabilizer 28 are integrated (interactively related) to provide enhanced aerodynamic performance for the helicopter 10 in the hover and forward flight regimes. In the embodiment of FIG. 4A, the shroud 22 is spatially orientated at a first predetermined cant angle with respect to the vertical plane Zs. The vertical stabilizer 28 is spatially orientated at a second predetermined cant angle with respect to the vertical plane Zs. The second predetermined cant angle is opposite in rotational sense to the first predetermined cant angle with respect to the vertical plane Zs.

The spatial orientation of the shroud 22, which contains the ducted fan antitorque device 18, improves the aerodynamic performance of the helicopter 10 in the hover regime by providing a positive vertical lift component as described in further detail hereinbelow. The spatial orientation of the shroud 22 also improves the center of gravity (C.G.) range of the helicopter 10 in the hover and cruise regimes.

Utilizing the ducted fan antitorque device 18 to provide antitorque thrust in higher speed flight regimes is aerodynamically inefficient inasmuch as such utilization of the ducted fan antitorque device 18 incurs a large drag penalty. This drag penalty is a result of the large volume of air flowing along the helicopter shroud 22 that would have to be turned into and ingested by the ducted fan antitorque device 18 during high speed forward flight (see FIG. 3). Turning and ingesting such a large volume air flow would create a large momentum drag.

To minimize drag in higher speed forward flight regimes and to simultaneously provide the required antitorque thrust required for yaw stability of the helicopter 10, the empennage structure 20 incorporates an optimally configured vertical stabilizer 28 to provide the majority of the required antitorque thrust in higher speed forward flight regimes. A 30% reduction in drag penalty may be achieved by utilizing the vertical stabilizer 28 to off-load the ducted fan antitorque device 18 in higher speed flight regimes since the aerodynamic configuration and/or orientation of the vertical stabilizer 28 is optimized to provide a higher lift to drag ratio than the ducted fan antitorque device 18.

The vertical stabilizer 28 is aerodynamically configured with a predetermined camber and/or aerodynamically orientated at a predetermined angle of incidence. The vertical stabilizer 28, as a result of its spatial orientation (predetermined cant angle), in combination with the aerodynamic configuration and/or orientation thereof, provides progressive off-loading of the ducted fan antitorque device 18 with increasing speeds in the forward flight regimes (off-loading is achieved by reducing the pitch angle of the tail rotor blades as speed increases).

The vertical stabilizer 28 provides the major portion (greater than 60% for the one preferred embodiment) of the antitorque thrust necessary for yaw stability of the helicopter 10 in the higher speed flight regimes. At high speed forward flight regimes, the ducted fan antitorque device 18 is not completely off-loaded, but rather is effectively off-loaded to such a degree that the ducted fan antitorque device 18 is still providing a target level of reduced thrust, for example about 150 pounds in the embodiment illustrated in FIGS. 1-3.

The integrated empennage structure 20 further comprises an aerodynamically configured and orientated horizontal stabilizer 30 that is optimized, in relation to a predetermined configuration and/or orientation of the vertical stabilizer 28, to provide negative vertical forces for dynamic pitch stability of the helicopter 10 in the forward flight regimes. The horizontal stabilizer 30 is disposed in intersecting combination with the vertical stabilizer 28 to minimize main rotor assembly 14 wake impingement effects.

The shroud 22, the vertical stabilizer 28 and the horizontal stabilizer 30 comprising the empennage structure 20 are exemplarily illustrated in FIG. 4A, a rear view looking forward along the longitudinal axis X—X. The shroud 22 embodying the ducted fan antitorque device 18 is spatially respect to the vertical plane of symmetry Zs of the helicopter fuselage 12. The vertical stabilizer 28 is spatially orientated at a second predetermined cant angle with respect to the vertical plane Zs. The second predetermine cant angle is opposite in rotational sense to the first predetermined cant angle with respect to the vertical plane Zs, as illustrated in FIG. 4A, such that the effective angular displacement between the medial plane 23 of the shroud 22 and the vertical stabilizer 28 is the sum of the first and second predetermined cant angles. Such a spatial orientation allows the horizontal stabilizer 30 to be advantageously mounted in substantially symmetrical relation with respect to the vertical stabilizer 28, as described in further detail hereinbelow.

The shroud 22 embodying the ducted fan antitorque device 18 is spatially orientated (canted) at a first predetermined cant angle $\theta 1$ relative to the vertical plane $Z_s$ (as illustrated in FIG. 4A, the cant angle $\theta 1$ between the medial plane 23 of the shroud 22 and the vertical plane Zs). The magnitude of the first predetermined cant angle $\theta 1$ is determined by such operating constraints as the cross coupling effects experienced during control range inputs to the ducted fan antitorque device 18, particularly with respect to heading tolerance limits, and the specific design mission of the helicopter 10. For one preferred embodiment, the input control range was about −35 to about +50 degrees of pitch.

Based upon a control range input to the ducted fan antitorque device 18 of about −35 to about +50 degrees of pitch and other operating constraints as exemplarily described hereinabove, the inventors have defined a range for the magnitude of the first predetermined cant angle $\theta 1$ of greater than 0 to about 20°. The magnitude of the first predetermined cant angle $\theta 1$ for the one preferred embodiment is about 13°.

The vertical stabilizer 28 is spatially orientated (canted) at a second predetermined cant angle $\theta 2$ relative to the vertical plane $Z_s$ (as illustrated in FIG. 4A, the cant angle $\theta 2$ between the medial plane 29 of the vertical stabilizer 21, at the forward edge thereof, and the vertical plane Zs). The magnitude of the second predetermined cant angle $\theta 2$ is based upon the magnitude of the first predetermined cant angle $\theta 1$. The second predetermined cant angle $\theta 2$ has a magnitude at least as great as the magnitude of the first predetermined cant angle $\theta 1$ to ensure that the intersection angle $\alpha$ between the vertical stabilizer 28 and the horizontal stabilizer 30 is greater than 90°. This characteristic minimizes aerodynamic interference between the vertical and horizontal stabilizers 28, 30.

The inventors have defined a range for the magnitude of the second predetermined cant angle $\theta 2$ based upon the minimization of aerodynamic interference effects between the vertical and horizontal stabilizers 28, 30 of about 0° to about 15° greater than the first predetermined cant angle $\theta 1$, and preferably about 5° to about 10° greater. The magnitude of the second predetermined cant angle $\theta 2$ for the one preferred embodiment of the helicopter 10 defined in the preceding paragraph is about 20°.

An examination of FIG. 4A shows that the spatial orientation of the shroud 22 is opposite in sense to the spatial orientation of the vertical stabilizer 28. That is, the first predetermined cant angle $\theta 1$ is counterclockwise with respect to the vertical plane Zs while the second predetermined cant angle $\theta 2$ is clockwise with respect to the vertical plane Zs. The effective angular displacement $\beta$ between the shroud 22 and the vertical stabilizer 28 is the sum of the first predetermined cant angle $\theta 1$ and the second predetermined cant angle $\theta 2$. The relative spatial relationship between the shroud 22 and the vertical stabilizer 28 of the empennage structure 20 defines an integrated shroud 22, vertical stabilizer combination 28 that provides antitorque thrust in the hover and forward speed flight regimes for yaw stability and direction control, provides a positive vertical lift component in the hover regime to increase the lift capability of the helicopter 10, effectively off-loads the ducted fan antitorque device 18 in the higher speed forward flight regimes to enhance helicopter aerodynamic performance in these flight regimes, and provides a negative vertical force component for dynamic pitch stability in the forward flight regimes.

The vertical stabilizer 28, based upon the spatial orientation described in the preceding paragraphs, is aerodynamically configured and/or orientated with a predetermined camber C and a predetermined angle of incidence I, respectively, to provide off-loading of the ducted fan antitorque device 18 in the higher speed forward flight regimes. For the embodiment of FIGS. 1-3, a NASA $63_3$A618 airfoil section (providing a 4° effective incidence through its predetermined camber C) was selected as the airfoil configuration for the vertical stabilizer 28 to provide the lateral force necessary to effectively off-load the ducted fan antitorque device 18 in the higher speed forward flight regimes. Other relevant dimensions of the one preferred embodiment of the vertical stabilizer 28 include a stabilizer area S of about 25 ft², a span b of about 7.5 ft (90 inches), a mean chord $C_m$ of about 38.5 inches, and an aspect ratio AR of about 2.35.

A predetermined angle of incidence I for the vertical stabilizer 28 is exemplarily illustrated in FIG. 4B, and is defined as the angle I between the chord 27 of the vertical stabilizer 28 and the vertical plane Zs. One selection criteria for the predetermined angle of incidence I is a magnitude sufficient for the vertical stabilizer 28 to develop an aerodynamic lifting force that effectively off-loads the ducted fan antitorque device 18 to a target value in the higher speed forward flight regimes. For one preferred embodiment, with an off-load target value of about 150 pounds, the predetermined angle of incidence I was about 6.5°. The vertical stabilizer 28, with a 6.5° angle of incidence, provides about 40% of the antitorque thrust required at a forward speed of about 120 knots, and more than 60% of the required antitorque thrust at $V_{max}$ (about 155 knots).

A thrust diagram for the ducted fan antitorque device 18 embodied in the empennage structure 20 is depicted in FIG. 4C. Mass airflow influx into the ducted fan antitorque device 18, as depicted in FIG. 3, is regulated to produce a thrust $F_{18}$ acting along the axis 19 of the ducted fan antitorque device 18 (the generated thrust $F_{18}$ is directed outwardly from the same side of the ducted fan antitorque device 18 as the mass airflow influx). Since the axis 19 of the ducted fan antitorque device 18 is offset with respect to the transverse axis Y—Y by the first predetermined cant angle $\theta 1$ (due to the spatial orientation of the shroud 22), the generated thrust $F_{18}$ may be resolved into an antitorque thrust component $F_{18AT}$ in the direction of the transverse axis Y—Y and a positive vertical force component $F_{18L}$ in the direction of the vertical axis Z—Z.

A force diagram for the vertical stabilizer 28 of the empennage structure 20 described in the preceding paragraphs is depicted in FIG. 4D. Mass airflow over the vertical stabilizer 28 produces an aerodynamic lifting force $F_{28}$ due to the aerodynamic configuration and/or orientation of the vertical stabilizer 28. Since the vertical stabilizer 28 is offset with respect to the transverse axis Y—Y by the second predetermined cant angle $\theta 2$, the lifting force $F_{28}$ produced by mass airflow over the vertical stabilizer 28 may be resolved into an antitorque force component $F_{28AT}$ in the direction of the transverse axis Y—Y and a negative vertical force component $F_{28L}$ in the direction of the vertical axis Z—Z.

In the hover regime, the antitorque thrust component $F_{18AT}$ produced by the ducted fan antitorque device 18 provides the antitorque force to counterbalance the moment-inducing effects of the main rotor assembly and to provide yaw directional control. In translational-to-low forward flight regimes, the antitorque force to counterbalance the moment-inducing effects of the main rotor assembly is provided by a combination of the antitorque thrust component $F_{18AT}$ produced by the ducted fan antitorque device 18 and the antitorque force component $F_{28AT}$ produced by mass airflow over the vertical stabilizer 28 (the ducted fan antitorque device 18 is progressively off-loaded at higher speeds by the vertical stabilizer 28) to minimize aerodynamic stresses on the fan assembly of the ducted fan antitorque device 18. In higher speed forward flight regimes, the antitorque force is effectively provided by the antitorque force component $F_{28AT}$ produced by mass airflow over the vertical stabilizer 28.

The negative vertical force component $F_{28L}$ provided by the vertical stabilizer 28 complements the negative lifting force $L_{30}$ (see FIG. 4A) provided by the horizontal stabilizer 30. Consequently, the aerodynamic functioning of the vertical stabilizer 28 allows the aerodynamic configuration and/or orientation of the horizontal stabilizer 30 to be reduced. These reductions result in weight savings and/or improved aerodynamic efficiency (through reduction in induced drag) for the empennage structure 20.

Furthermore, the aerodynamic effects produced by the aerodynamic operation of the vertical stabilizer 28 facilitates a substantially symmetrical attachment of the horizontal stabilizer 30 in combination with the vertical stabilizer 28 as illustrated in FIG. 4A. Smaller dynamic forces are transferred through the attachment fitting with the result that the fitting may be reduced in size and weight. In addition, aerodynamic interference between the cambered surfaces of the vertical and horizontal stabilizers 28, 30 is minimized by the obtuseness of the intersection angle $\alpha$ between the horizontal and vertical stabilizers 28, 30, which effectively spaces the respective suction surfaces of the vertical and horizontal stabilizers 28, 30 a greater distance apart.

The horizontal stabilizer 30 is aerodynamically configured and orientated to optimize the dynamic pitch stability of the helicopter 10 in the forward flight regimes. The horizontal stabilizer 30 has an unswept planform and a relatively high aspect ratio. For the one preferred embodiment, the horizontal stabilizer 30 has an aerodynamic configuration that includes an area S of about 19 ft$^2$, a span b of about 8.45 feet (101 inches), a mean chord Cm of about 27, and an aspect ratio AR of about 3.75. The one preferred embodiment incorporates an SU3015 airfoil section (Sikorsky uncambered, 15% thick, 30 series airfoil).

With reference to FIG. 2, the horizontal stabilizer 30 is mounted in combination with the vertical stabilizer 28 to define a cruciform empennage configuration. It is within the scope of the present invention to attach the horizontal stabilizer 30 in combination with the vertical stabilizer 28 to define a "T" configuration. In either embodiment, the horizontal stabilizer 30 is attached at a high vertical stabilizer 28 location to minimize main rotor blade wake impingement effects on mass airflow over the horizontal stabilizer 30. The angle of incidence of the horizontal stabilizer 30 is relatively low, and is based upon a compromise between longitudinal control margins and vibrations induced by the wake from the main rotor assembly 14. For the one preferred embodiment, an angle of incidence of $-3°$ ($\pm 5°$) provide satisfactory dynamic pitch stability.

A more detailed description of the structural and functional characteristics of the shroud 22, the vertical stabilizer 28, and the horizontal stabilizer 30 comprising the empennage structure 20 is presented in commonly-owned, co-pending patent application entitled INTEGRATED HELICOPTER EMPENNAGE STRUCTURE (Now U.S. Pat. No. 5,102,067), which is incorporated herein by reference.

The ducted fan antitorque device 18 according to the present invention has a configuration that is optimized to provide the antitorque thrust required by the helicopter 10 for yaw stability and maneuverability in hover and forward flight operations. The ducted fan antitorque device 18 may be spatially orientated, see discussion hereinabove with respect the spatial orientation of the shroud 22, to provide a vertical lift component that contributes to the general lift capability of the helicopter 10. Concomitantly, the configuration of the ducted fan antitorque device 18 is optimized to reduce the operating noise levels of the ducted fan antitorque device 18.

The structural and functional characteristics of the ducted fan antitorque device 18 of the present invention as described in the following paragraphs are based upon a helicopter having a main rotor assembly 14 wherein the main rotor blades rotate in a counterclockwise direction (as viewed looking down on the helicopter). Consonant with this operating constraint, the ducted fan antitorque device 18 is operative for bottom-blade-forward (BBF) rotation of the tail rotor blades to provide the required antitorque thrust. It will be appreciated by those skilled in the art, however, that the ducted fan antitorque device 18 of the present invention may also be utilized in helicopters having clockwise rotation of the main rotor blades (with corresponding rotation of the tail rotor blades). The following disclosure, accordingly, is not intended to limit the scope of the claimed subject matter of the present invention.

The design dimensions of the ducted fan antitorque device 18 and the operating characteristics thereof such as fan thrust and fan control range are based upon the mission requirements that the helicopter 10 must be capable of achieving. For example, one such set of operating constraints that may drive the design dimensions of the ducted fan antitorque device 18 for one preferred embodiment are a fan power/control range to provide maximum antitorque thrust in hover in a 45 knot right crosswind and a yaw acceleration of 0.85 rad/sec$^2$ (50 deg/sec$^2$) in a light crosswind (up to about 15 knots). These operating constraints define a helicopter having an antitorque thrust generating capability to achieve a 180° hover turn, stop-to-stop, in five second in light crosswinds.

The ducted fan antitorque device 18 of the present invention is disposed in combination with the shroud 22 to provide a low torque waterline so that the ducted fan antitorque device 18 does not contribute a significant roll moment when collective pitch is increased (which causes a corresponding increase in antitorque thrust). Such spatial positioning of the ducted fan antitorque device 18 eliminates the need for mechanical coupling of the lateral cyclic to the collective.

Figure 5A:
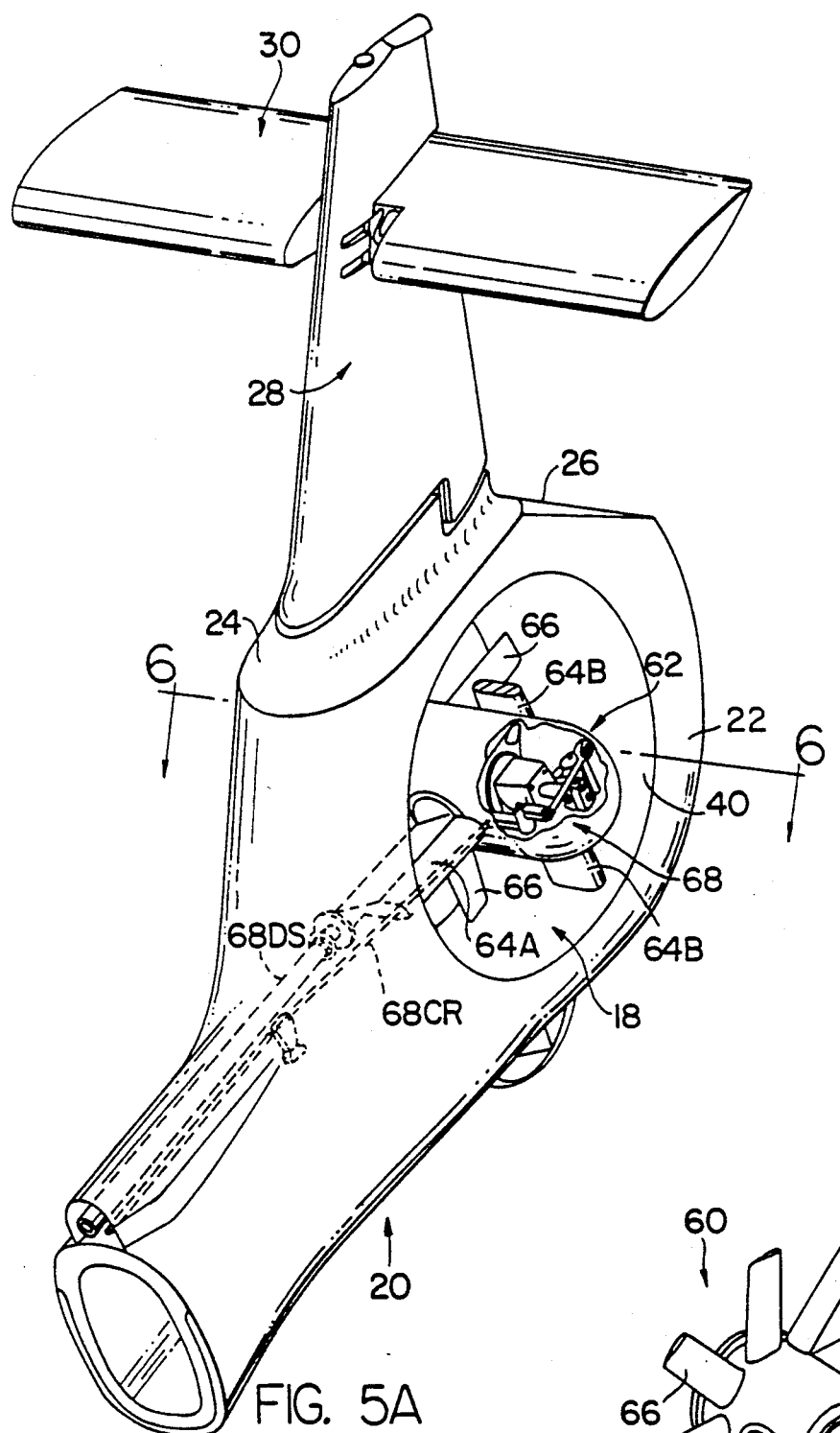
FIGS. 5A, 5B are perspective views illustrating an embodiment of the ducted fan antitorque device according to the present invention.
Figure 5B:
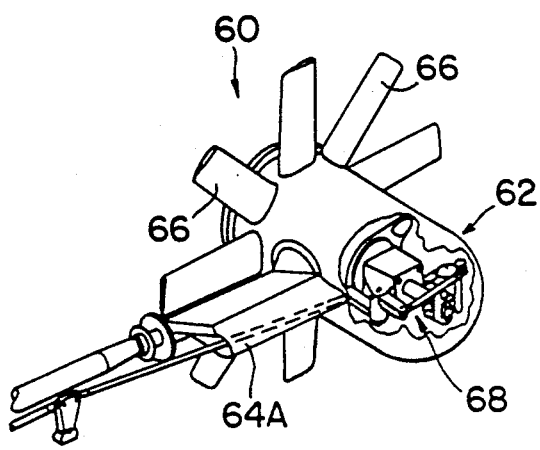

With reference to FIGS. 5A, 5B, 6, the ducted fan antitorque device 18 according to the present invention comprises an airflow duct 40 and a fan assembly 60 mounted within the duct 40. The duct 40 is disposed in combination within the shroud 22 so that the axis 19 of the ducted fan antitorque device 18 is substantially perpendicular to the medial plane of the shroud 22. The resultant spatial orientation of the ducted fan antitorque device 18, with the shroud 22 spatially orientated as described hereinabove, is such that the axis 19 is offset relative to the transverse axis Y—Y of the helicopter 10 by the first predetermined cant angle $\theta 1$.

The configuration of the airflow duct 40 includes a duct diameter 42, a duct width 44 (transverse dimension), an inlet 46 having an inlet lip configuration 46R of predetermined constant radius, a divergent duct portion 48, and an outlet 50 having an outlet lip configuration 50R of predetermined, variable radius. The configurations and dimensions of various elements comprising the duct 40 influence the overall aerodynamic performance of the ducted fan antitorque device 18 according to the present invention.

Constraints such as main rotor diameter, engine power available, and the size of the fan assembly 60 affect the sizing of the duct diameter 42. The diameter of the main rotor assembly 14 and the operating characteristics thereof define the range of antitorque thrust that must be provided by the ducted fan antitorque device 18 to counterbalance the induced-torque effects of the main rotor assembly 14. In addition, the ducted fan antitorque device 18 must be operative to provide any additional thrust dictated by flight operating constraints of the helicopter 10 such as those described hereinabove (e.g., turn capability in defined hover conditions). The size of the fan assembly 60 (e.g., span of the tail rotor blades) is one of the primary determinants of the thrust generation capability of the ducted fan antitorque device 18 according to the present invention.

The diameter of the fan assembly 60, however, is directly related to and influences the sizing of the duct diameter 42 (pragmatically, for descriptive purposes the diameter of the fan assembly 60 is substantially equivalent to the duct diameter 42). An increased duct diameter 42 permits a larger diameter fan assembly 60 to be utilized to generate the required antitorque thrust, which decreases the power required by the ducted fan antitorque device 18 and the frequencies of the harmonic noise. Such a configuration, however, imposes an increased weight on the ducted fan antitorque device 18, and hence, overall system weight. Decreasing the duct diameter 42 reduces the diameter (and hence weight) of the fan assembly 60, but increases the frequencies of the harmonic noise and requires more These factors are weighted to provide an optimal duct diameter 42 for the ducted fan antitorque device 18 according to the present invention. The one preferred embodiment has a duct diameter 42 (as measured at the plane of the tail rotor blades—see FIG. 6) of about 4 feet. Another preferred embodiment has a duct diameter 42 of about 4.5 feet.

Optimally a duct width (transverse dimension) 44 to diameter (L/D) ratio of 1.0 maximizes antitorque thrust production by the ducted fan antitorque device 18 (the L/D ratio is based upon the diameter of the fan assembly 60, which for descriptive purposes is assumed to be equal to the duct diameter 42—see fan assembly 60 description hereinbelow). A duct width 44 equal to the diameter, however, is not a practical consideration for the empennage structure 20 since this would result in a large shroud 22 width (transverse dimension) which would result in an empennage structure 20 of excessive weight. A primary factor in determining duct width 44 from a pragmatic perspective is the separation distance between the plane of the tail rotor blades and the leading edge of the hub support struts as discussed hereinbelow in further detail. The inventors have determined that an L/D ratio of about 0.4 provides a ducted fan antitorque device 18 configuration capable of effectively providing the required level of antitorque thrust. For one preferred embodiment, the airflow duct 40 has a duct width 44 of about 1.8 feet.

The aerodynamic performance of the ducted fan antitorque device 18 is significantly influenced by the configuration of the inlet 46. The inlet configuration 46 determines the degree of distortion of the mass airflow influx (non-uniformity of the airflow velocity distribution), the characteristic of the boundary layer flow (attached or separated), and the sideforces induced on the empennage structure 20 resulting from redirection of the mass airflow influx. The configuration of the inlet 46 should provide the fan assembly 60 with mass airflow having an attached boundary layer and a relatively uniform velocity distribution, i.e., to minimize turbulence, to the extent practicable.

A curved inlet configuration is clearly preferable to a sharp-edged inlet configuration due to consideration of mass airflow separation effects. It has been determined that a small radius of curvature lip 46, in combination with a downstream divergent duct portion 48 (following the blade plane of the fan assembly 60) provides good performance in both the hover and higher speed flight regimes by allowing the mass airflow influx to remain attached to the inlet surface. The inventors determined that a magnitude for the ratio of the inlet lip radius 46R to the duct diameter 42 of greater than 0.065 to about 0.075 produces satisfactory mass airflow influx during hover operations and in higher speed forward flight regimes. For one preferred embodiment, the ducted fan antitorque device 18 has an inlet radius 46R of about 4 inches.

The divergent duct portion 48 of the airflow duct 40 (defined as that portion of the duct 40 downstream from the plane of the tail rotor blades of the fan assembly 60) in combination with the configuration of the outlet 50 effects the shape of the mass airflow efflux, which in turn influences the performance of the ducted fan antitorque device 18. The divergent duct portion 48 and the outlet 50 are configured to prevent separation of the mass airflow from the duct 40 and to eliminate slipstream contraction aft of the ducted fan antitorque device 18. An effective interaction between the divergent duct portion 48 and the outlet 50 provides an increase in mass airflow influx into the ducted fan antitorque device 18 during flight operations.

The configuration of the divergent duct portion 48 facilitates pressure recovery on the duct 40. An excessive divergence angle, however, will cause flow separation from the duct walls, will increase turbulence noise, and will degrade reverse thrust operation (mass airflow through the duct 40 is reversed in nose-right sideslip flight conditions such that the inlet 44 functions as the outlet and vice versa). The inventors have determined that a duct divergance angle Φ (see FIG. 6) of about 5° provides attached mass airflow through the divergent duct portion 48 of the duct 40, and also provides satisfactory performance during reverse thrust operations.

Conventional design methodology typically utilizes an outlet having an acute lip configuration (sharp angle or minimal radius) to cleanly separate the mass airflow efflux from the adjacent tail structure. An acute lip configuration minimizes suction effects at the outlet, suction effects at the outlet causing a degradation in the antitorque thrust producing capability of a ducted fan antitorque device. An acute lip configuration, however, degrades the performance of a ducted fan antitorque device during reverse thrust operations wherein the outlet effectively functions to provide mass airflow influx.

Figure 7:
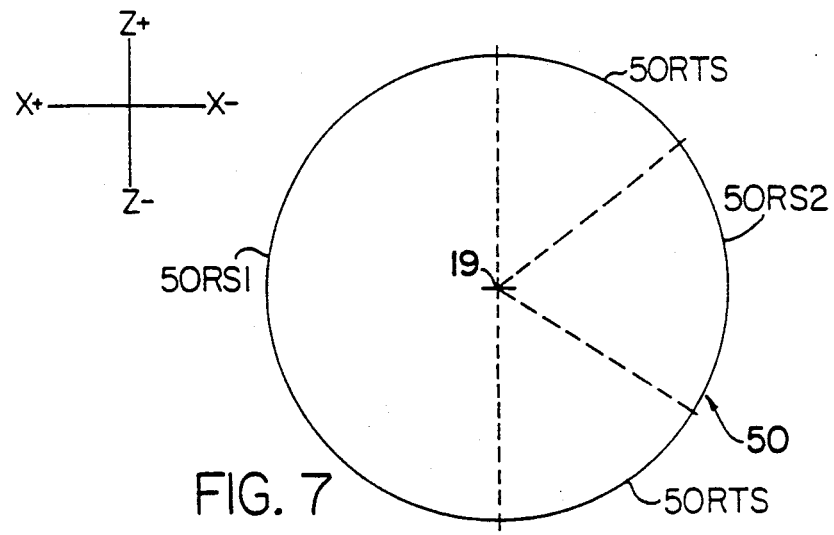
FIG. 7 is a plan view of the outlet of the ducted fan antitorque device illustrating the variable lip radius thereof.

The inventors have determined that an outlet 50 having a curved lip configuration 50R of variable radius improves the reverse thrust capability of the ducted fan antitorque device 18 according to the present invention, and in addition, reduces the parasite drag of the ducted fan antitorque device 18 in forward flight regimes. A plan view of one preferred embodiment of the outlet 50 depicting the curved lip configuration 50R of variable radius is illustrated in FIG. 7. The longitudinal and vertical axes X—X, Z—Z of the helicopter 10 are illustrated to provide a frame of reference, X+ indicating the longitudinal axis in the forward flight direction of the helicopter 10.

The curved lip configuration 50R includes a first constant radius lip segment 50RS1, a second constant radius lip segment 50RS2, and intermediate variable radius transition segments 50RTS that provide a smooth structural transition between the first and second constant radius lip segments 50RS1, 50RS2. The first constant radius lip segment 50RS1 has a radius of curvature R1 that is less than the radius of curvature R2 of the second constant radius lip segment 50RS2. For one preferred embodiment, the first constant radius lip segment 50RS1 has a radius of curvature R1 of about 0.5 inches and the second constant radius lip segment 50R2 has a radius of curvature R2 of about 4 inches.

As illustrated in FIG. 7, the first constant radius lip segment 50RS1 encompasses a 180° sector of the curved lip configuration 50 (sector is symmetrically disposed with respect to the longitudinal axis in the forward direction) and the second constant radius lip segment 50RS2 encompasses a 90° sector of the curved lip configuration 50 (sector is symmetrically disposed with respect to the longitudinal axis in the aft direction). It will be appreciated that the constant radius lip segments 50RS1, 50RS2 may encompass sectors of the curved lip configuration 50 of different degree and/or orientation and still be within the scope of the present invention. For example, the second constant lip segment 50RS2 may encompass a 120° sector of the curved lip configuration 50 (symmetrically disposed with respect to the longitudinal axis in the aft direction).

With reference to FIGS. 5A, 5B, the fan assembly 60 includes an aerodynamically-shaped hub structure 62, a plurality of aerodynamically configured support struts 64 for mounting the hub structure 62 in the airflow duct 40, and a plurality of tail rotor blades 66 rotatably attached to the hub structure 62. The tail rotor blades 66 are aerodynamically configured and manipulable for the generation of thrust. The hub structure 62 functions as a housing for fan assembly operating subsystems 68 such as the tail rotor gearbox and the servo controls for regulating the operation (pitch changes) of the tail rotor blades 66. The hub structure 62 also functions as the rotational mount for the tail rotor blades 66.

The plane 66P of the tail rotor blades 66 is transverse to the axis 19 of the ducted fan antitorque device 18 and is located immediately downstream of the curvature termination point of the inlet lip radius 46R, as illustrated in FIG. 6. The separation distance 70 between the blade plane 66P and the leading edges of the support struts 64 is a primary factor affecting noise generation by the ducted fan antitorque device 18. The inventors determined that to essentially eliminate acoustic interaction tones induced on the rotor blades 66 by the support struts 64, the ratio of the separation distance 70 to the strut dimension 64d, discussed hereinbelow in further detail, should be relatively large, on the order of about 2.0 to about 2.5.

The support struts 64 have an elliptical configuration to minimize turbulence and vortex shedding. Elliptically configured support struts 64 reduce loading on the tail rotor blades 66 during normal operation of the ducted fan antitorque device 18, and concomitantly, the induced loading noise, and reduce thrust losses due to separation drag. The elliptical configuration also reduces turbulence ingestion in the reverse thrust condition, which concomitantly reduces noise arising from turbulence induced loading. The elliptical configuration of the support struts 64 and the corresponding strut dimension 64d are exemplarily illustrated in FIG. 6. Minimally the elliptical configuration for the support struts 64 should be a 2:1 ellipse, and preferably a 3 to 3.5:1 ellipse.

The ducted fan antitorque device 18 of the present invention utilizes three elliptically-configured support struts 64 that function as structural supports to coaxially mount the hub structure 62 within the airflow duct 40. One end of each support strut 64 passes through the duct 40 to secure the support struts 64 to structural members of the shroud 22. A first support strut 64A is a radially disposed (with respect to the axis 19), longitudinally orientated (with respect to the helicopter axes) aerodynamically-configured support structure extending between the hub structure 62 and the airflow duct 40. A control rod 68CR and a drive shaft 68DS, which provide interfacing between the control system and the transmission system and fan assembly operating subsystems 68 (servo control and tail rotor gearbox, respectively), are housed internally within the first support structure 64A.

The other two aerodynamically-configured support struts 64B are radially off-set from the axis 19, i.e., provide non-radial mounting structures between the hub structure 62 and the shroud 22. These support struts 64B are collinear with respect to one another and vertically orientated (with respect to the helicopter axes). Tail rotor blade 66 sweep over the non-radial, vertically orientated support struts 64B is relatively gradual as compared to radially orientated support struts (instantaneous blade sweep) such that induced pressure (loading) gradients on the tail rotor blades 66 are shallow. The non-radial, vertical orientation of the support struts 64 minimizes induced blade loading noise.

The tail rotor subsystem is a rigid rotor having plurality of tail rotor blades 66. Eight (8) tail rotor blades 66 were selected for the tail rotor subsystem of the ducted fan antitorque device 18 based upon acoustic, reliability, durability, and survivability considerations. Each of the 8 rotor blades 66 is larger and more rugged than the tail rotor blades of the Aerospatiale helicopters embodying a ducted fan antitorque device having either 11 or 13 tail rotor blades. A tail rotor subassembly having only 8 tail rotor blades 66 facilitates reduction of the blade passage frequency phenomenon which causes the loudest portion of the blade generated noise level to be well below the audio frequency range of the highest hearing sensitivity, yet not so low as to allow long range propagation of its acoustic signature.

The rotor blades 66 have an untapered planform configuration which provides maximum thrust generating capability and simplifies blade manufacturing procedures. The airfoil section of the tail rotor blades 66 is a NACA 64 series such as the 64A322 airfoil which provides the best performance (design tip speed) over the required range of operating conditions. Each rotor blade 66 has a predetermined chord to provide high solidity to meet a yaw acceleration design performance requirement of 0.85 rad/sec$^2$ and low blade loading. For one preferred embodiment, the predetermined chord is about 0.55 ft. Each rotor blade 66 has a predetermined twist of about $-7°$ twist hub-to-tip to provide good control response, particularly at low and negative thrust levels.

The tail rotor blades 66 are operative for BBF rotation to minimize interference effects with the main rotor wake. The pitch control range of the tail rotor blades 66 has been increased to permit pitch control regulation over a wide control range for thrust variation for enhanced maneuverability, particularly in effecting new maneuvers, as discussed briefly hereinbelow. The control rod 68CR of the fan assembly operating subsystems 68 provides the means for effecting such pitch changes. For the one preferred embodiment, the control range for the tail rotor blades 66 is about $-35°$ to about $+50°$. The $50°$ positive pitch limit was selected to coincide with the onset of stall of the tail rotor blades 66 in the hover regime. The operating tip speed for the tail rotor blades 66 was selected based upon noise considerations. A lower blade tip speed reduces both the amplitude and the frequency of blade tip generated noise. For one embodiment, a blade tip speed of about 600 ft/sec, reducible to about 540 ft/sec by the pilot, was chosen. For another embodiment, a maximum blade tip speed not exceeding 675 ft/sec was selected, such speed being reducible to about 620 ft/sec.

To optimize fan assembly 60 performance by minimizing pressure losses across the rotor blades 66, a small clearance (of about 0.1 inch) is provided between the tips of the rotor blades 66 and the surface of the airflow duct 40. In light of the small magnitude of the clearance dimension versus the overall fan assembly diameter of about 4 to about 4.5 feet, the overall fan diameter may be used to describe the duct diameter 42 for most purposes.

Figure 8:
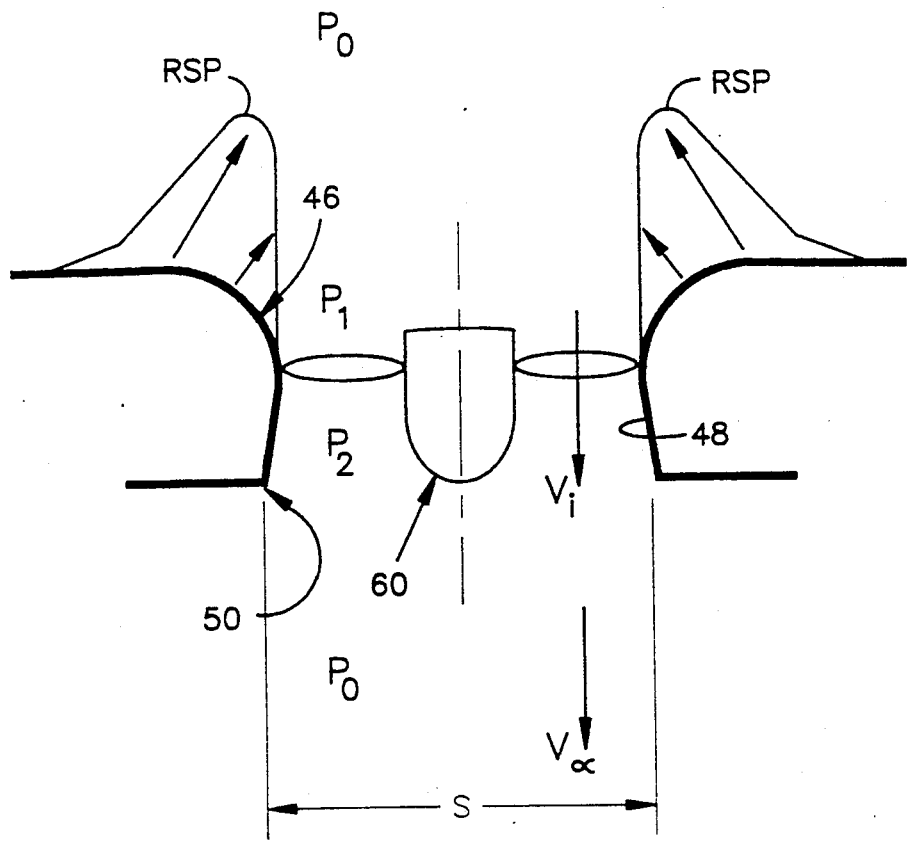
FIG. 8 is a schematic depiction of the thrust augmentation mechanism for the ducted fan antitorque device according to the present invention.

Due to the characteristics of the mass airflow influx into the ducted fan antitorque device 18 during operation thereof, the inlet lip configuration 46 and portions of the shroud 22 adjacent thereto function as aerodynamic lifting surfaces in hover and forward flight regimes to provide thrust augmentation, i.e., thrust over and above that produced by the fan assembly 60 of the ducted fan antitorque device 18. The thrust augmentation provided by the inlet lip configuration 46 and adjacent portions of the shroud 22 is a result of the reduced static pressure RSP in these regions as a result of fan assembly 60 induced velocities in the mass airflow influx, as schematically illustrated in FIG. 8.

For an ideal ducted fan antitorque device, suction as a result of the reduced static pressure RSP is equal in magnitude to the thrust produced by the ducted fan antitorque device, resulting in an optimum thrust augmentation factor of two. In right and left sideslip flight conditions, the optimum thrust augmentation factor decreases and increases, respectively, due to induced velocity dependence. In the forward flight regimes, the thrust increment due to the inlet lip configuration is greater than the hover value due to stoppage of the mass airflow influx momentum and the re-expansion of stagnated mass airflow from the duct outlet.

For the ducted fan antitorque device 18 as described in the preceding paragraphs, actual thrust augmentation is approximately equal to optimum thrust augmentation for the hover and sideward flight regimes of the helicopter 10. Actual thrust augmentation in the forward flight regimes is close to the ideal value of two, although some loss of lift is experienced due to free stream turning of the mass airflow influx.

The ducted fan antitorque device 18 of the present invention provides advantages other than those described in the preceding paragraphs. The ducted fan antitorque device 18 provides the capability for unrestricted yaw pointing maneuvers ($360°$ snap turns—"snap turn" is a coined phrase defining pure yaw pointing maneuvers versus conventional banked turns implemented via the cyclic control) up to about 80 knots, and accommodates restricted yaw maneuvers ($90°$ to $30°$ snap turns) up to about 140 knots. The antitorque thrust provided by the ducted fan antitorque device 18 may be utilized for "snap turn" maneuvering of the helicopter 10 in the higher speed forward flight regimes. At forward speeds of about 70-110 knots, $90°$ snap turns may be effected in about 2 to about 3.5 seconds (versus 4-5 seconds using aggressive banked turns). The restoring moment provided by the vertical stabilizer 28 provides significant rate damping an positive pedal trim gradient such that yaw workload is low during snap turns.

Furthermore, the ducted fan antitorque device 18 provides a significantly large sideslip envelope out to $V_{max}$ for the helicopter 10. Large sideslip angles may be sustained without the high blade loading customarily experienced by helicopters having exposed tail rotor assemblies. The configuration of the ducted fan antitorque device 18 effectively eliminates angle of attack effects experienced by exposed tail rotor blades in sideslipped flight. Flight operations in trimmed rearward flight regimes may be accomplished with less yaw workload than experienced in helicopters embodying conventional exposed tail rotor assemblies due to the ability of the ducted fan antitorque device 18 to straighten mass airflow influx, thereby reducing the sensitivity of the helicopter 10 to angle of attack.

A variety of modifications and variations of the present invention are possible in light of the above teachings. It is therefore to be understood that, within the scope of the appended claims, the present invention may be practiced otherwise than as specifically described hereinabove.

What is claimed is:

1. For a helicopter having a main rotor assembly, a fuselage, a tail boom, and an empennage structure including a shroud, a vertical stabilizer, and a horizontal stabilizer, a ducted fan antitorque device, comprising:
   airflow duct means having an axis and configured for mounting internally in the shroud with said axis substantially perpendicular to the medial plane of the shroud, said airflow duct means including
      an inlet having a curved lip configuration of constant radius,
      a divergent duct portion downstream of and contiguous to said inlet, and
      an outlet terminating said divergent duct portion and having a curved lip configuration that includes a first constant radius lip segment, a second constant radius lip segment, and intermediate lip segments of variable radius intermediate said first and second constant radius lip segments to provide smooth structural transition therebetween; and
   fan assembly means mounted in said airflow duct means for generating antitorque thrust for yaw stability and maneuverability of the helicopter, said fan assembly means including
      tail rotor means for generating antitorque thrust for yaw stability and maneuverability of the helicopter,
      hub structure means coaxially mounted in said airflow duct means and configured for rotatably mounting said tail rotor means coaxially within said airflow duct means, said coaxially mounted tail rotor means defining a blade plane, and
      support strut means for coaxially mounting said hub structure means in said airflow duct means, said support strut means having an elliptical configuration, and further wherein said support strut means includes non-radial support strut means extending non-radially with respect to said airflow duct axis for coaxially mounting said hub structure means in said airflow duct means.

2. The ducted fan antitorque device of claim 1 wherein said support strut means comprises:
   a first elliptically configured support strut extending radially with respect to airflow duct said axis between said hub structure means and said airflow duct means, said first support strut being orientated parallel to the longitudinal axis of the shroud; and wherein said non-radial support strut means comprises
   second and third elliptically configured support struts extending non-radially with respect to said airflow duct axis between said hub structure means and said airflow duct means, said second and third support struts being orientated parallel to the vertical axis of the shroud.

3. The ducted fan antitorque device of claim 2 wherein said second and third elliptically configured support struts are collinear with respect to one another.

4. The ducted fan antitorque device of claim 1 wherein said support strut means have a predetermined dimension, said predetermined dimension defining a minor axis of said elliptical configuration.

5. The ducted fan antitorque device of claim 4 wherein said elliptical configuration of said support strut means is an ellipse defined by a ratio having a value within the range of about a 2:1 to about a 3.5:1, and wherein said ratio is based upon said predetermined dimension defining said minor axis of said ellipse.

6. The ducted fan antitorque device of claim 5 wherein said ellipse is defined by said ratio having a value within the range of about a 3:1 to about a 3.5:1, and wherein said ratio is based upon said predetermined dimension defining said minor axis of said ellipse.

7. The ducted fan antitorque device of claim 1 wherein said support strut means is spaced apart from said blade plane a predetermined distance based upon said elliptical configuration of said support strut means.

8. The ducted fan antitorque device of claim 7 wherein said support strut means have a predetermined dimension, said predetermined dimension defining a minor axis of said elliptical configuration and wherein said predetermined distance defining the spacing between said blade plane and said support strut means is within the range of about 2 to about 2.5 times said predetermined dimension of said support strut means.

9. The ducted fan antitorque device of claim 1 wherein said tail rotor means comprises a rigid rotor having a plurality of tail rotor blades affixed thereto.

10. The ducted fan antitorque device of claim 9 wherein said tail rotor means comprises eight tail rotor blades.

11. The ducted fan antitorque device of claim 10 wherein said tail rotor blades have a blade tip speed not exceeding 675 ft/sec.

12. The ducted fan antitorque device of claim 10 wherein said tail rotor blades are adjustable through a pitch angle control range of about $-35$ to about $+50°$.

13. The ducted fan antitorque device of claim 1 wherein said divergent duct portion has a constant predetermined angle of divergence.

14. The ducted fan antitorque device of claim 13 wherein said constant predetermined angle of divergence of said divergent duct portion is about $5°$.

15. The ducted fan antitorque device of claim 1 wherein
   said first constant radius lip segment of said curved lip configuration of said outlet has a predetermined radius of curvature, and
   said second constant radius lip segment of said curved lip configuration of said outlet has a predetermined radius of curvature, said predetermined radius of curvature of said second constant radius lip segment having a magnitude greater than said predetermined radius of curvature of said first constant radius lip segment.

16. The ducted fan antitorque device of claim 15 wherein said first constant radius lip segment encompasses a 180° sector of said curved lip configuration, said 180° sector being symmetrically disposed with respect to the longitudinal axis in the forward direction and said second constant radius lip segment encompasses a 90° sector of said curved lip configuration, said 90° sector being symmetrically disposed with respect to the longitudinal axis in the aft direction.

* * * * *